(12) United States Patent
Hattori

(10) Patent No.: US 11,511,602 B2
(45) Date of Patent: Nov. 29, 2022

(54) WIND DIRECTION ADJUSTING APPARATUS

(71) Applicant: NIHON PLAST CO., LTD., Shizuoka (JP)

(72) Inventor: Akio Hattori, Shizuoka (JP)

(73) Assignee: NIHON PLAST CO., LTD., Shizuoka (JP)

( * ) Notice: Subject to any disclaimer, the term of this patent is extended or adjusted under 35 U.S.C. 154(b) by 220 days.

(21) Appl. No.: 16/671,203

(22) Filed: Nov. 1, 2019

(65) Prior Publication Data

US 2020/0139791 A1    May 7, 2020

(30) Foreign Application Priority Data

Nov. 1, 2018    (JP) .............................. JP2018-206630

(51) Int. Cl.
*B60H 1/34*    (2006.01)

(52) U.S. Cl.
CPC .................................. *B60H 1/3421* (2013.01)

(58) Field of Classification Search
CPC ........ B60H 1/34; B60H 1/3421; B60H 1/345; B60H 2001/3471; B60H 2001/3478
USPC ........................................................ 454/155
See application file for complete search history.

(56) References Cited

U.S. PATENT DOCUMENTS

| | | | | |
|---|---|---|---|---|
| 7,887,400 B2 * | 2/2011 | Shibata | ................ | B60H 1/3421 454/155 |
| 2001/0031619 A1 * | 10/2001 | Yabuya | ................ | B60H 1/3421 454/155 |
| 2008/0146139 A1 * | 6/2008 | Terai | ................... | B60H 1/3421 454/155 |
| 2014/0308889 A1 | 10/2014 | Oe et al. | | |
| 2018/0170152 A1 | 6/2018 | Lee | | |

FOREIGN PATENT DOCUMENTS

| | | |
|---|---|---|
| DE | 202014104226 U1 | 11/2014 |
| DE | 102014001959 A1 | 8/2015 |
| DE | 102014221641 A1 | 4/2016 |
| DE | 102017109463 A1 | 6/2018 |
| JP | 2007-010272 A | 1/2007 |
| WO | 2013069316 A1 | 5/2013 |

OTHER PUBLICATIONS

German Office Action dated Nov. 16, 2020.

* cited by examiner

*Primary Examiner* — Avinash A Savani
*Assistant Examiner* — Dana K Tighe
(74) *Attorney, Agent, or Firm* — Brundidge & Stanger, P.C.

(57) ABSTRACT

A wind direction adjusting apparatus which can appropriately adjust a wind direction with a simple structure is provided. A case body includes an upstream portion located in a relatively upstream side of the wind, and a downstream portion located in a downstream side of the wind with respect to the upstream portion and expanded in a short direction of an outlet from the upstream portion. Fins include end fins each having a fixed end positioned along an edge portion of the outlet in a longitudinal direction and an intermediate fin located between the end fins. The end fins and the intermediate fin pivot in a same direction in conjunction with each other. Each end fin is disposed so as to intersect an imaginary line in a wind passage direction along a narrowed portion in a state in which each end fin is pivoted to a downstream portion side.

2 Claims, 4 Drawing Sheets

WIND DIRECTION ADJUSTING APPARATUS

CROSS REFERENCE TO RELATED APPLICATION

This application is entitled to the benefit of Japanese Patent Application No. 2018-206630 filed on Nov. 1, 2018, the disclosure of which including the specification, drawings and abstract is incorporated herein by reference in its entirety.

TECHNICAL FIELD

The present invention relates to a wind direction adjusting apparatus including fins that are disposed so as to be pivotable in an outlet from which a wind passing through a case body is blown out.

BACKGROUND ART

Conventionally, in an air conditioner used for a vehicle such as an automobile, a wind direction adjusting apparatus provided in an outlet for blowing out a wind is also called a conditioned air blowout apparatus, an air outlet, a ventilator, a register, or the like, is installed, for example, in each part of the vehicle such as an instrument panel or a center console portion, and contributes to the improvement of comfort performance with air conditioning.

As such a wind direction adjusting apparatus, there is a thin type in which a height of a ventilation passage is lowered. In a case of such a thin type wind direction adjusting apparatus, since the number of fins for adjusting a wind direction in a vertical direction is limited, it is not easy to appropriately adjust the wind direction. Therefore, a register is known in which the wind direction can be adjusted by pivoting a fin, which is in a direction in which an operation knob has pivoted, is pivoted in an opposite direction to the other fin in a pair of fins in which a fin is interposed at a center, which includes the operation knob, even if a height of a ventilation passage and the number of fins are limited (see, for example, PTL 1).

CITATION LIST

Patent Literature

PTL 1
International Publication No. 2013/069316 (pages 9 to 11, and FIGS. 5 and 6)

SUMMARY OF INVENTION

Technical Problem

However, in the case of the wind direction adjusting apparatus described above, a structure becomes complicated, such as using a link having a special shape in order to make the pivoting of the fin in non-conjunction with the pivoting direction of the other fin. Therefore, there is a concern that a manufacturing cost increases. In addition, when the fin equipped with the operation knob is swung downward, a space between the operation knob and the fin disposed on the lower side and pivoted in a reverse direction becomes narrow. Therefore, an air volume should not be impaired.

The present invention is made in view of such a point, and an object thereof is to provide a wind direction adjusting apparatus which can appropriately adjust a wind direction with a simple structure.

Solution to Problem

A wind direction adjusting apparatus described in a first aspect including: a case body through which a wind passes; an elongated outlet from which the wind that has passed through the case body is blown out; and at least three fins disposed so as to be pivotable in a short direction of the outlet. The case body includes a first portion that is located in a relatively upstream side of the wind, and a second portion that is located in a downstream side of the wind with respect to the first portion, and is expanded in the short direction of the outlet from the first portion. The fins include end fins each having a fixed end positioned along an edge portion of the outlet in a longitudinal direction and an intermediate fin located between the end fins, the end fins and the intermediate fin pivot in a same direction in conjunction with each other, and each end fin is disposed so as to intersect an imaginary line in a wind passage direction along a narrowest inner surface position in the short direction of the outlet in the first portion, in a state in which each end fin has pivoted to a second portion side.

The wind direction adjusting apparatus described in a second aspect according to the first aspect, further including: a restraining portion that is provided in at least one of the edge portions of the outlet in the longitudinal direction, and restrains wind leakage between the edge portion and the fixed end of the end fin close to the edge portion.

Advantageous Effects of Invention

According to the wind direction adjusting apparatus of the first aspect, in a state in which one end fin is pivoted to the second portion side, the other end fin pivots in a direction away from the second portion, so that the end fins and the intermediate fin interlock with each other to pivot in the same direction. Therefore, since one end fin is located so as to intersect the imaginary line of the wind passage direction along the narrowest inner surface position in the short direction of the outlet in the first portion, one end fin receives the wind flowing through the first portion to the outlet. Therefore, the wind can be straightened between the end fins and the intermediate fin, and a vortex is generated between the other end fin and the second portion. The vortex causes a passage of the wind flowing through the first portion to the outlet to change. Therefore, the wind can be straightened between the end fins and the intermediate fin. Accordingly, a wind direction can be appropriately adjusted with a simple configuration.

According to the wind direction adjusting apparatus of the second aspect, in addition to the effect of the wind direction adjusting apparatus of the first aspect, the restraining portion restrains the wind leakage between the edge portion of the outlet in the longitudinal direction and the fixed end of the end fin close to the edge portion. Therefore, the wind direction can be adjusted more appropriately, and the generation of wind noise caused by the wind leakage can be suppressed.

DESCRIPTION OF EMBODIMENTS

Figure 1:
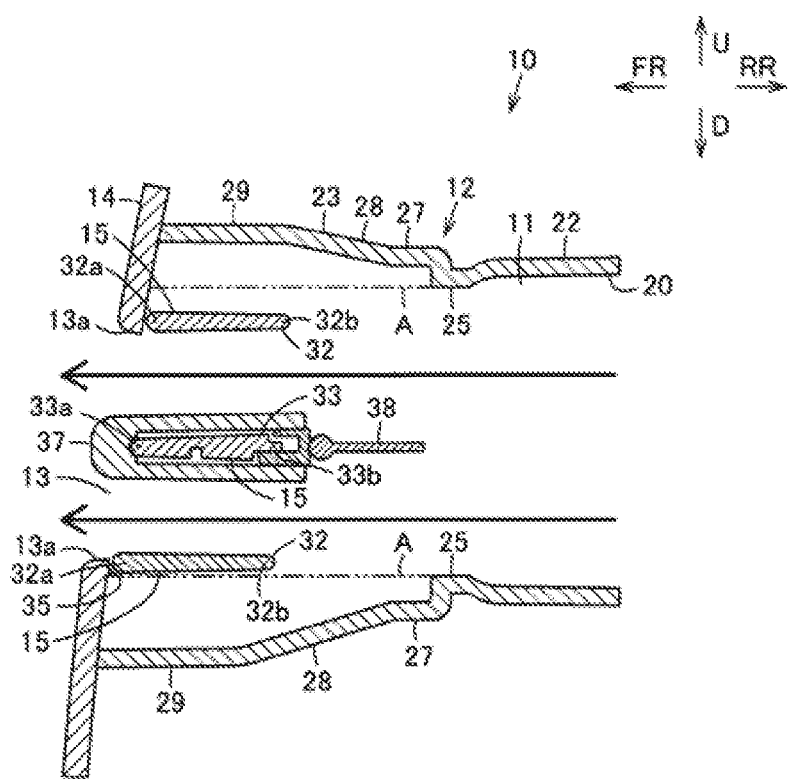
FIG. 1 is a sectional view illustrating a neutral state of fins in a wind direction adjusting apparatus according to an embodiment of the present invention.

Hereinafter, a configuration of an embodiment of the present invention will be described with reference to the drawings.

In FIGS. 1 to 4, reference numeral 10 denotes a wind direction adjusting apparatus. Wind direction adjusting apparatus 10 is provided for air conditioning, which adjusts, for example, a direction of a wind, that is, a wind direction from an air conditioner provided in a vehicle such as an automobile. Although not illustrated, wind direction adjusting apparatus 10 is installed in a built-in member of the automobile, for example, an installed portion such as an instrument panel, a center console, an overhead console portion, a center pillar, or a door trim.

Wind direction adjusting apparatus 10 includes case body 12 that internally forms ventilation passage 11 through which a conditioned air passes, finisher 14 that is an opening member that includes elongated outlet 13 and is attached to case body 12, and three or more fins 15. Further, wind direction adjusting apparatus 10 may include upstream-side fins on an upstream side of fins 15. Hereinafter, in order to clarify the explanation, in wind direction adjusting apparatus 10, a downstream side of the wind passing through ventilation passage 11, that is, a passenger side is referred to as a front side (arrow FR direction), the upstream side is a rear side (arrow RR direction), one side and the other side in a longitudinal direction of outlet 13 intersecting (orthogonal) with respect to a front-rear direction are referred to as a left-right direction (arrow L direction and arrow R direction), and one side and the other side in a short direction of outlet 13 are referred to as a vertical direction (arrow U direction and arrow D direction). However, these directions are appropriately changed depending on an installation position and an installation direction of wind direction adjusting apparatus 10.

Case body 12 is formed in a cylindrical shape. A rear end portion of case body 12 serves as inlet 20 that receives the conditioned air from an air passage such as a duct into ventilation passage 11. Further, case body 12 is integrally provided with upstream portion 22 that is a first portion constituting the rear side that is the upstream side, and downstream portion 23 that is a second portion continuous with the front side that is the downstream side of upstream portion 22. In the present embodiment, two case bodies 12 are provided adjacent to each other in the left-right direction. However, only one case body may be provided, or three or more case bodies 12 may be provided adjacent to each other. Further, since an inside of each case body 12 has basically the same shape, only one case body 12 will be described, and the description of other case body 12 will be omitted.

Upstream portion 22 is located in the relatively rear side that is the upstream side of the wind with respect to downstream portion 23. Upstream portion 22 is formed in a rectangular tube shape, and in the illustrated example, has a substantially constant sectional shape from inlet 20 to the front side. The front end portion is contracted toward the front side, that is, is formed to be narrowed up and down. That is, upstream portion 22 of the present embodiment is formed of narrowed portion 25 of which a front end is the narrowest position in the vertical direction. Narrowed portion 25 is at the narrowest position in the vertical direction in ventilation passage 11 inside case body 12. Narrowed portion 25 is formed in a flat shape with a predetermined distance along the front-rear direction. Further, a vertical dimension of narrowed portion 25 is set larger than a vertical dimension of outlet 13. Further, narrowed portion 25 is formed continuously with downstream portion 23. Narrowed portion 25 can be provided at an arbitrary position of upstream portion 22.

In the present embodiment, downstream portion 23 constitutes the downstream side of case body 12. That is, downstream portion 23 is located continuously with finisher 14. Downstream portion 23 is formed so as to be enlarged in the vertical direction more than upstream portion 22. Downstream portion 23 of the present embodiment includes first enlarged portion 27 that constitutes the rear end portion of downstream portion 23 and is enlarged in a step shape with respect to narrowed portion 25 of upstream portion 22, second enlarged portion 28 that is connected to the front end, which is the downstream end of first enlarged portion 27, and gradually expands in the vertical direction toward the front side that is the downstream side, and third enlarged portion 29 that is connected to the front end, which is the downstream end of second enlarged portion 28, and constitutes the front end portion of downstream portion 23. In the present embodiment, first and third enlarged portions 27 and 29 each having a substantially constant sectional shape larger than that of upstream portion 22. In the present embodiment, second enlarged portion 28 is gradually expanded in the vertical direction from first enlarged portion 27 to third enlarged portion 29 at a substantially constant rate. Further, second enlarged portion 28 is formed to extend to the front side at a portion of the lower side longer than that of the upper side of case body 12. Third enlarged portion 29 is adjacent to finisher 14, is at a position close to outlet 13 in the front-rear direction, and is wider than outlet 13 in the vertical and horizontal directions.

Outlet 13 is formed through finisher 14. Outlet 13 is formed in a quadrangular shape having a pair of up and down edge portions 13a and 13a in the longitudinal direction and a pair of left and right end portions 13b and 13b in the short direction. Although outlet 13 of the present embodiment is formed for each case body 12, one outlet 13 that is connected over a plurality of case bodies 12 may be formed.

Finisher 14 is, for example, a design member that forms a part of the built-in member of the automobile. Finisher 14 is formed in a plate shape and is integrally attached to the front end portion of case body 12. Finisher 14 of the present embodiment is disposed so as to be inclined from the upper side to the lower side and from the rear side to the front side. In the present embodiment, one finisher 14 is attached in common to the plurality of case bodies 12, but one finisher 14 may be attached to each case body 12.

Fin 15 is also called a horizontal louver, a front louver, or the like. End fins 32 and 32 and intermediate fin 33 located between end fins 32 and 32 are set in fins 15. In the present embodiment, end fins 32 are a pair of upper and lower end fins, and one intermediate fin 33 is disposed between end fins 32 and 32. End fins 32 and 32, and intermediate fin 33 are disposed so as to be pivotable in a vertically same direction in conjunction with each other via a link.

Figure 2:
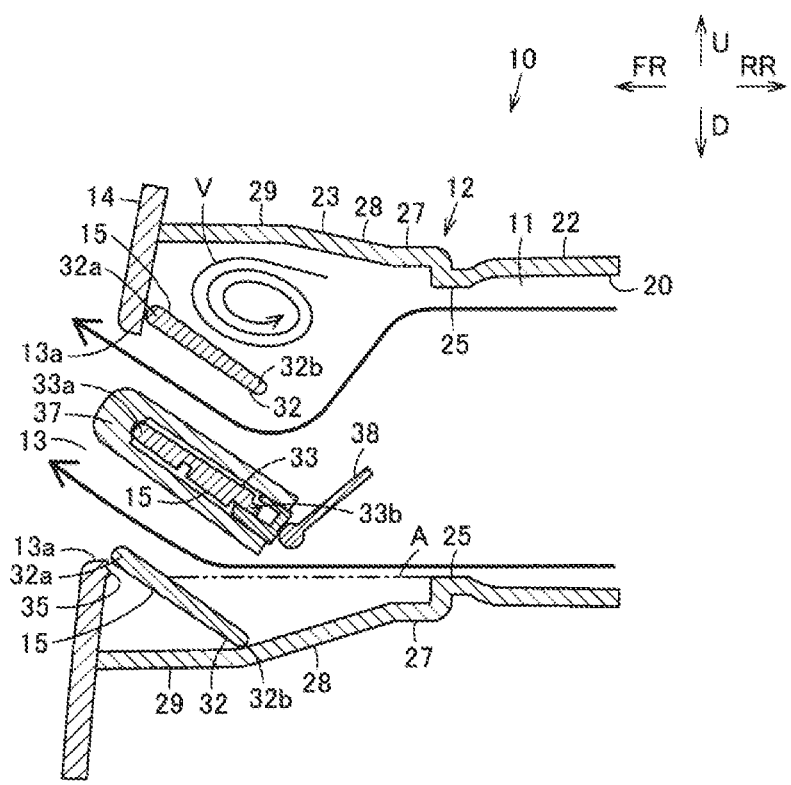
FIG. 2 is a sectional view illustrating a state in which the fins of the wind direction adjusting apparatus are swung up.
Figure 3:
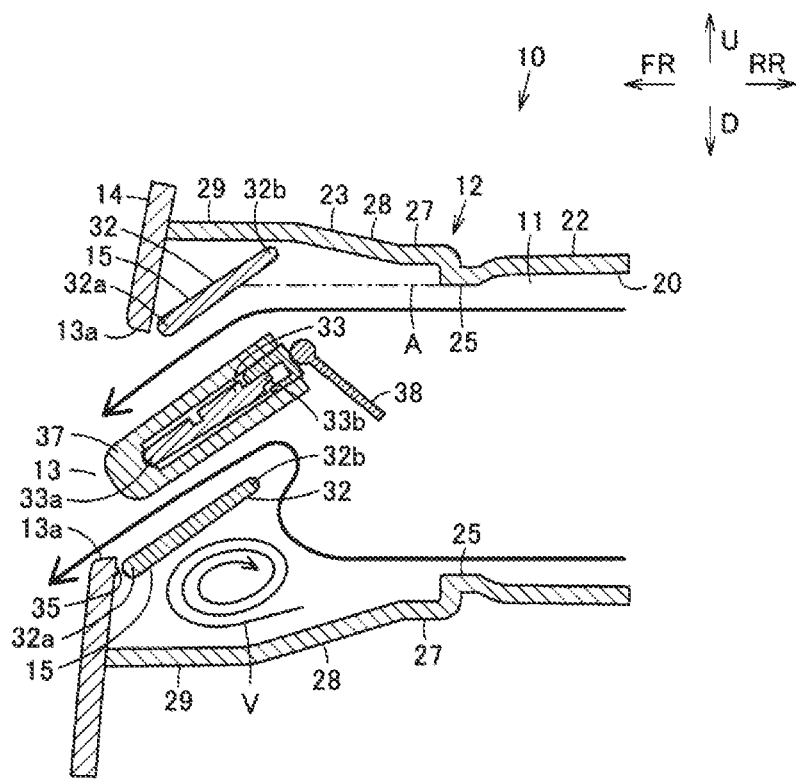
FIG. 3 is a sectional view illustrating a state in which the fins of the wind direction adjusting apparatus are swung down.
Figure 4:
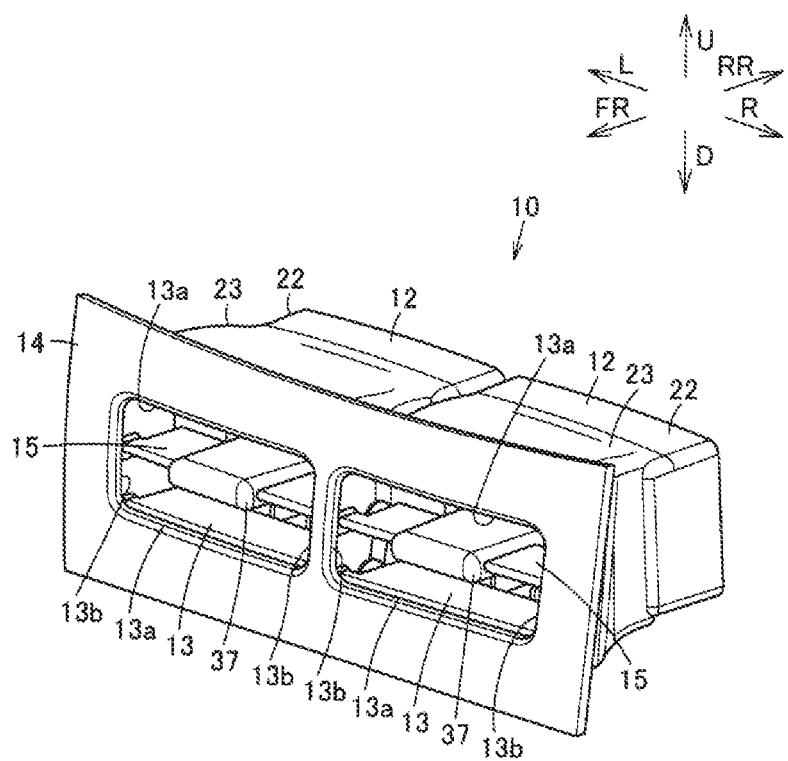
FIG. 4 is a perspective view of the wind direction adjusting apparatus.

Each end fin 32 has a thickness in the vertical direction and is formed to longitudinally extend in the left-right direction. Each end fin 32 of the present embodiment is formed so that the thickness gradually decreases from the fixed end 32a side that is pivotably supported to a free end 32b side that is a pivot end moving up and down. Each end fin 32 is located inside case body 12 (ventilation passage 11), and is disposed such that each fixed end 32a is located along edge portion 13a of outlet 13 in the longitudinal direction. Fixed end 32a of each end fin 32 is located close to edge portion 13a of outlet 13 in the longitudinal direction. Further, in the present embodiment, fixed end 32a of each end fin 32 is at a position that does not intersect imaginary line A in the front-rear direction, which is the wind passage direction along narrowest narrowed portion 25 of upstream portion 22 of case body 12 in the vertical direction. That is, fixed end 32a of each end fin 32 is located to be shifted from imaginary line A toward the edge portion 13a side of outlet 13 in the longitudinal direction. Fixed end 32a of upper end fin 32 is located below upper imaginary line A, and fixed end 32a of lower end fin 32 is located above lower imaginary line A. Further, at least one of edge portions 13a of outlet 13 in the longitudinal direction close to fixed end 32a of each end fin 32, in the present embodiment, lower edge portion 13a has rib 35 as a restraining portion. Rib 35 narrows a gap between fixed end 32a of end fin 32 and finisher 14, and suppresses air leakage between outlet 13 and fixed end 32a of end fin 32. Rib 35 protrudes from a rear surface of finisher 14. Further, free end 32b of each end fin 32 is located to extend to the rear side which is the upstream side of fixed end 32a. Further, as illustrated in FIGS. 2 and 3, each end fin 32 is disposed so as to intersect imaginary line A in a state in which free end 32b is pivoted to be swung to the downstream portion 23 side. Therefore, each end fin 32 faces the wind going straight toward outlet 13 along upstream portion 22 in the front-rear direction in the state in which end fin 32 has swung toward the downstream portion 23 side, and is pivotable so as to be at a position at which the wind is received. That is, in each end fin 32, a pivot range (first pivot range) in which the wind is received by intersecting imaginary line A, and is straightened, and a pivot range (second pivot range) in which the wind is straightened without intersecting imaginary line A are set. In a state in which one end fin 32 is in the first pivot range, other end fin 32 is in conjunction therewith so as to be in the second pivot range.

Similar to end fins 32, intermediate fin 33 has a thickness in the vertical direction, is formed to longitudinally extend in the left-right direction, and is formed so that a thickness gradually decreases from a fixed end 33a side that is pivotably supported to a free end 33b side that is a pivot end moving up and down. Intermediate fin 33 is disposed substantially parallel to end fins 32. Intermediate fin 33 of the present embodiment is located at a center portion of upper and lower end fins 32 and 32. In addition, fixed end 33a of intermediate fin 33 is disposed at the center portion of outlet 13 in the vertical direction. Free end 33b of intermediate fin 33 is located so as to extend to the rear side that is the upstream side with respect to fixed end 33a. Further, operation knob 37 is attached to intermediate fin 33. Operation knob 37 is a knob that a vehicle occupant or the like picks when fin 15 is pivoted. Operation knob 37 is located at the center of intermediate fin 33 in the longitudinal direction. Further, operation knob 37 is formed with fork portion 38 which is a connecting portion connected to the upstream fin. Fork portion 38 is pivotably connected to a rear portion of operation knob 37, and a front side pivots in an opposite direction to intermediate fin 33 in a state in which intermediate fin 33 is pivoted in the vertical direction together with operation knob 37, and the connection with the upstream fin is maintained.

The upstream fin is also called a vertical louver, a rear louver, or the like. The upstream fin is disposed, for example, inside upstream portion 22 of case body 12. For example, a plurality of upstream fins are disposed in left-right direction intersecting fins 15, and are disposed so as to be pivotable in the laterally same direction in conjunction with each other via a link or the like. The upstream fins of the present embodiment are configured, for example, to be pivoted in the left-right direction by causing operation knob 37 to slide in the left-right direction along intermediate fin 33.

Next, an operation of the embodiment will be described.

As illustrated in FIG. 1, in a state in which fins 15 are in the neutral position in the pivoting direction, each end fin 32 and intermediate fin 33 are located along the front-rear direction and the wind received from inlet 20 into ventilation passage 11 is straightened along the upstream fins and fins 15, and linearly blown out from outlet 13.

As illustrated in FIG. 2, in a state in which fins 15 are swung in one side in the vertical direction, for example, upward, lower end fin 32 pivots to the downstream portion 23 side and is at a position intersecting imaginary line A. Thus, the wind going straight through the lower side of upstream portion 22 is straightened by lower end fin 32, passes between lower end fin 32 and intermediate fin 33, and is blown out upward from outlet 13. Further, when upper end fin 32 pivots in a direction away from downstream portion 23, a part of the wind going straight through upstream portion 22 causes vortex V between upper end fin 32 and downstream portion 23. Therefore, most of the wind going straight through the upper side of upstream portion 22 is blocked by vortex V, changes a course thereof, and passes between upper end fin 32 and intermediate fin 33, thereby being blown out upward from outlet 13.

Similarly, as illustrated in FIG. 3, in a state in which fins 15 are swung in the other side in the vertical direction, for example, downward, upper end fin 32 pivots to the downstream portion 23 side and is at a position intersecting imaginary line A. Thus, the wind going straight through the upper side of upstream portion 22 is straightened by upper end fin 32, and passes between upper end fin 32 and intermediate fin 33, thereby being blown out downward from outlet 13. Further, when lower end fin 32 pivots in a direction away from downstream portion 23, a part of the wind going straight through upstream portion 22 causes vortex V between lower end fin 32 and downstream portion 23. Therefore, most of the wind going straight through the lower side of upstream portion 22 is blocked by vortex V, changes a course thereof, and passes between lower end fin 32 and intermediate fin 33, thereby being blown out downward from outlet 13.

As described above, according to the embodiment, each end fin 32 and intermediate fin 33 are pivoted in the same direction in conjunction with each other, so that in a state in which one end fin 32 is pivoted toward the downstream portion 23 side, other end fin 32 pivots in a direction away from downstream portion 23. Therefore, one end fin 32 is at a position that intersects imaginary line A in the wind passage direction along narrowed portion 25 that is the narrowest inner surface position of outlet 13 in upstream portion 22 in the short direction. Therefore, one end fin 32 receives the wind flowing through upstream portion 22 to outlet 13 and the wind can be straightened between end fin 32 and intermediate fin 33, and other end fin 32 causes vortex V in a space between other end fin 32 and downstream portion 23. The course of the wind flowing through upstream portion 22 to outlet 13 is changed by vortex V, and the wind can be straightened between end fin 32 and intermediate fin 33. Therefore, for example, the wind direction can be appropriately adjusted with a simple configuration without using a complicated configuration in which one end fin 32 and other end fin 32 are pivoted in reverse directions.

Further, each end fin 32 is located at a position at which fixed end 32a does not intersect imaginary line A, so that a large space can be taken between each end fin 32 and downstream portion 23. Therefore, when fins 15 are swung up and down, vortex V generated between end fins 32 and downstream portion 23 is increased, and vortex V effectively changes the wind direction of the straight wind can be effectively changed by vortex V, thereby making it possible to adjust the wind direction more appropriately.

Furthermore, rib 35 suppresses the air leakage between edge portion 13a of outlet 13 in the longitudinal direction and fixed end 32a of end fin 32 close to edge portion 13a. Therefore, the wind direction can be adjusted more appropriately and generation of the wind noise resulting from the wind leakage can be suppressed.

In the embodiment described above, wind direction adjusting apparatus 10 can also be applied for a passenger, for example, in a backseat provided at the rear end portion of the console box.

The number of intermediate fins is not limited to one, and two or more intermediate fins may be set depending on the height of ventilation passage 11.

Rib 35 may be provided on upper edge portion 13a of outlet 13 in the longitudinal direction, or may be provided on upper and lower edge portions 13a, respectively.

Industrial Applicability

The present invention can be suitably used, for example, as a wind direction adjusting apparatus for air conditioning of an automobile.

REFERENCE SIGNS LIST 10 wind direction adjusting apparatus
12 case body
13 outlet
13a edge portion
15 fin
22 upstream portion that is first portion
23 downstream portion that is second portion
32 end fin
32a fixed end
33 intermediate fin
35 rib that is restraining portion
A imaginary line

What is claimed is:

1. A wind direction adjusting apparatus, comprising:
a case body through which a wind passes;
an elongated outlet from which the wind that has passed through the case body is blown out; and
at least three fins disposed so as to be pivotable in a short direction of the outlet,
wherein the case body includes:
  a first portion that is located in a relatively upstream side of the wind; and
  a second portion that is located in a downstream side of the wind with respect to the first portion, and is expanded in the short direction of the outlet from the first portion, and
wherein the first portion includes a narrowed portion that constitutes a narrowest position in the short direction of the outlet,
the second portion includes a front end enlarged portion constituting a front end of the second portion and an intermediate enlarged portion having a width in the short direction which gradually varies from the narrowed portion toward the front end enlarged portion,
on the downstream side of the narrowed portion, the front end enlarged portion constitutes a widest position in the short direction of the outlet, and
the at least three fins include end fins having a fixed end positioned along an edge portion of the outlet in a longitudinal direction and a free end located to extend to the upstream side of the fixed end, and an intermediate fin located between the end fins, the end fins and the intermediate fin pivot in a same direction in conjunction with each other, and each end fin is disposed so as to intersect at a free end side of the end fin an imaginary line of a wind passage direction along the narrowed portion in the short direction of the outlet in the first portion, in a state in which each end fin has pivoted to a second portion side, and
the at least three fins are configured to pivot between top and bottom walls of the front end enlarged portion.

2. The wind direction adjusting apparatus according to claim 1, further comprising:
a restraining portion that is provided in at least one of the edge portions of the outlet in the longitudinal direction, and restrains wind leakage between the edge portion and the fixed end of the end fin close to the edge portion.

* * * * *